(12) United States Patent
Oswald et al.

(10) Patent No.: US 10,994,651 B2
(45) Date of Patent: May 4, 2021

(54) METHOD AND SYSTEM FOR NOTIFYING AN OPERATOR

(71) Applicant: Westinghouse Air Brake Technologies Corporation, Wilmerding, PA (US)

(72) Inventors: James A. Oswald, Coggon, IA (US); Igor Abrosimov, N. Potomac, MD (US); Brian Kurz, Frederick, MD (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 0 days.

(21) Appl. No.: 16/670,380

(22) Filed: Oct. 31, 2019

(65) Prior Publication Data

US 2020/0122634 A1    Apr. 23, 2020

Related U.S. Application Data

(63) Continuation-in-part of application No. 16/168,447, filed on Oct. 23, 2018.

(51) Int. Cl.
*B60Q 1/50* (2006.01)
*B60Q 5/00* (2006.01)
*B60Q 1/54* (2006.01)

(52) U.S. Cl.
CPC ............ *B60Q 1/50* (2013.01); *B60Q 1/503* (2013.01); *B60Q 1/54* (2013.01); *B60Q 5/005* (2013.01)

(58) Field of Classification Search
CPC ................................. B60Q 1/50; G01S 19/42
USPC ........................................................ 340/901
See application file for complete search history.

(56) References Cited

U.S. PATENT DOCUMENTS

| | | | |
|---|---|---|---|
| 5,720,455 A | 2/1998 | Kull et al. | |
| 2007/0030170 A1* | 2/2007 | Manor | G01S 13/91 340/933 |
| 2009/0273941 A1* | 11/2009 | Englander | B60Q 1/24 362/464 |
| 2013/0187771 A1* | 7/2013 | Rothschild | G08G 1/096716 340/435 |
| 2014/0012455 A1* | 1/2014 | Neff | G05D 1/0231 701/25 |
| 2014/0145838 A1* | 5/2014 | Tuukkanen | G08G 1/162 340/436 |

(Continued)

OTHER PUBLICATIONS

Final Office Action dated Oct. 17, 2019 for U.S. Appl. No. 16/168,447, 12 pages.

*Primary Examiner* — Fabricio R Murillo Garcia
(74) *Attorney, Agent, or Firm* — Josef L. Hoffmann; The Small Patent Law Group, LLC

(57) ABSTRACT

A system that includes a notification light configured to be coupled with a first vehicle and to emit light to notify an approaching, second vehicle of the location of the first vehicle. A controller is provided that includes one or more processors configured to determine one or more of a direction of movement of the first vehicle, a speed of the movement of the first vehicle, or a distance between the first vehicle and the approaching, second vehicle. The controller is configured to notify the approaching, second vehicle of the one or more of the direction of the movement of the first vehicle, the speed of the movement of the first vehicle, or the distance between the first vehicle and the second vehicle by directing the notification light to change a characteristic of the light emitted by the notification light.

21 Claims, 8 Drawing Sheets

(56) References Cited

U.S. PATENT DOCUMENTS

| | | |
|---|---|---|
| 2014/0183303 A1 | 7/2014 | Kramer et al. |
| 2016/0176424 A1 | 6/2016 | Kupiec et al. |
| 2018/0229649 A1* | 8/2018 | Salter .................. B60Q 1/52 |
| 2018/0300993 A1* | 10/2018 | Corradini ................ B62J 6/05 |
| 2019/0152392 A1* | 5/2019 | DePaschoal ......... H04N 13/239 |
| 2019/0168666 A1* | 6/2019 | Nomura ................. B60Q 3/14 |

* cited by examiner

METHOD AND SYSTEM FOR NOTIFYING AN OPERATOR

CROSS REFERENCE

This application is a continuation-in-part of, and claims priority to, U.S. patent application Ser. No. 16/168,447, which was filed on Oct. 23, 2018, and the entire disclosure of which is incorporated herein by reference.

BACKGROUND

Technical Field

The subject matter described herein relates to vehicle notification systems that provide information to a vehicle operator.

Description of the Art

In certain applications, vehicles travel in close proximity with one another. Typically, the vehicles have end of vehicle notification lights to provide a warning to other vehicle operators. For example, when a brake is applied, the notification light may active as a warning for an approaching vehicle that the braking vehicle is braking. Still, often such notification lights are insufficient when vehicles travel in close proximity.

The need for improved notification warning system is even more pronounced in certain industries. For example, there is demand for rail-based vehicles to make as many trips carrying freight, cargo, goods, etc. as possible to meet customer needs and desires. As a result, spacing along the track for rail vehicles that are using common rails is becoming tighter between the vehicles. Additionally, as technologies advance with regard to fuel efficiency and emissions control, these rail vehicles are able to efficiently move at increased velocities along the rail as well.

To combat safety issues in rail vehicles, positive train control (PTC) is used by vehicle controllers to prevent potentially unsafe movement of rail vehicles. Controllers that use PTC may communicate, including wirelessly, with other rail vehicles, command center devices, dispatch devices, etc. to receive information related to other vehicles, and safety related to different routes. Still, unexpected movement, and rail vehicles that don't use PTC continue to exist on the railways.

Some rail vehicles include end of vehicle devices that may include a flashing light that provides a warning signal that may be seen by oncoming, or nearby vehicles, to alert vehicles on the same track of each other's existence. In one such example, the end of vehicle device is an end of train (EOT) device. While the end of vehicle device provides warning, with the increased speeds of vehicles and reduced spacing, greater safety is desired for these vehicles.

BRIEF DESCRIPTION

In accordance with one embodiment, a system is provided that includes a notification light configured to be coupled with a first vehicle. The notification light emits light to notify an approaching, second vehicle of the location of the first vehicle. A controller is also provided that includes one or more processors configured to determine one or more of a direction of movement of the first vehicle, a speed of the movement of the first vehicle, or a distance between the first vehicle and the approaching, second vehicle. The controller is configured to notify the approaching, second vehicle of one or more of the direction of the movement of the first vehicle, the speed of the movement of the first vehicle, or the distance between the first vehicle and the second vehicle by directing the notification light to change a characteristic of the light emitted by the notification light.

In accordance with one embodiment, a method is provided that includes determining one or more of a direction of movement of a first vehicle, a speed of the movement of the first vehicle, or a distance between the first vehicle and an approaching, second vehicle. The approaching, second vehicle is notified of the one or more of the direction of the movement of the first vehicle, the speed of the movement of the first vehicle, or the distance between the first vehicle and the second vehicle by changing a characteristic of the light emitted by the notification light.

In accordance with one embodiment, a system is provided that includes a notification light configured to be coupled with a first vehicle and to emit light to notify an approaching, second vehicle of the location of the first vehicle, and at least one sensor electrically coupled to the one or more processors and configured to receive an input associated with a direction of movement of the first vehicle, a speed of the movement of the first vehicle, or a distance between the first vehicle and an approaching, second vehicle. The one or more processors are configured to determine one or more of the direction of movement of the first vehicle, the speed of the movement of the first vehicle, or the distance between the first vehicle and the approaching, second vehicle based on the input of the at least one sensor. The one or more processors are configured to notify the approaching, second vehicle of the one or more of the direction of the movement of the first vehicle, the speed of the movement of the first vehicle, or the distance between the first vehicle and the second vehicle by directing the notification light to change a characteristic of the light emitted by the notification light.

BRIEF DESCRIPTION OF THE DRAWINGS

The inventive subject matter may be understood from reading the following description of non-limiting embodiments, with reference to the attached drawings, wherein below.

DETAILED DESCRIPTION

The subject matter described herein relates to visually providing notification of the location and/or movement of one vehicle to at least one other vehicle. One or more processors may determine information related to a first vehicle and/or the second vehicle, and then provide lighting-based notifications that present information to the second vehicle based on the information that is determined. A notification light may change characteristics to convey the information, such as by changing light colors, changing visual patterns, displaying text and/or numbers, flashing the light, etc. to provide information associated with the first vehicle. The information can include the speed of the first vehicle, whether the first vehicle is braking, whether the first vehicle is reversing, whether the first vehicle will be making a stop, whether the first vehicle will be changing direction, etc. In this manner, the notification light can indicate that a vehicle is present and share additional information about the first vehicle. This can result in quicker reaction time for operating the second vehicle to avoid collision with the first vehicle.

Figure 1:
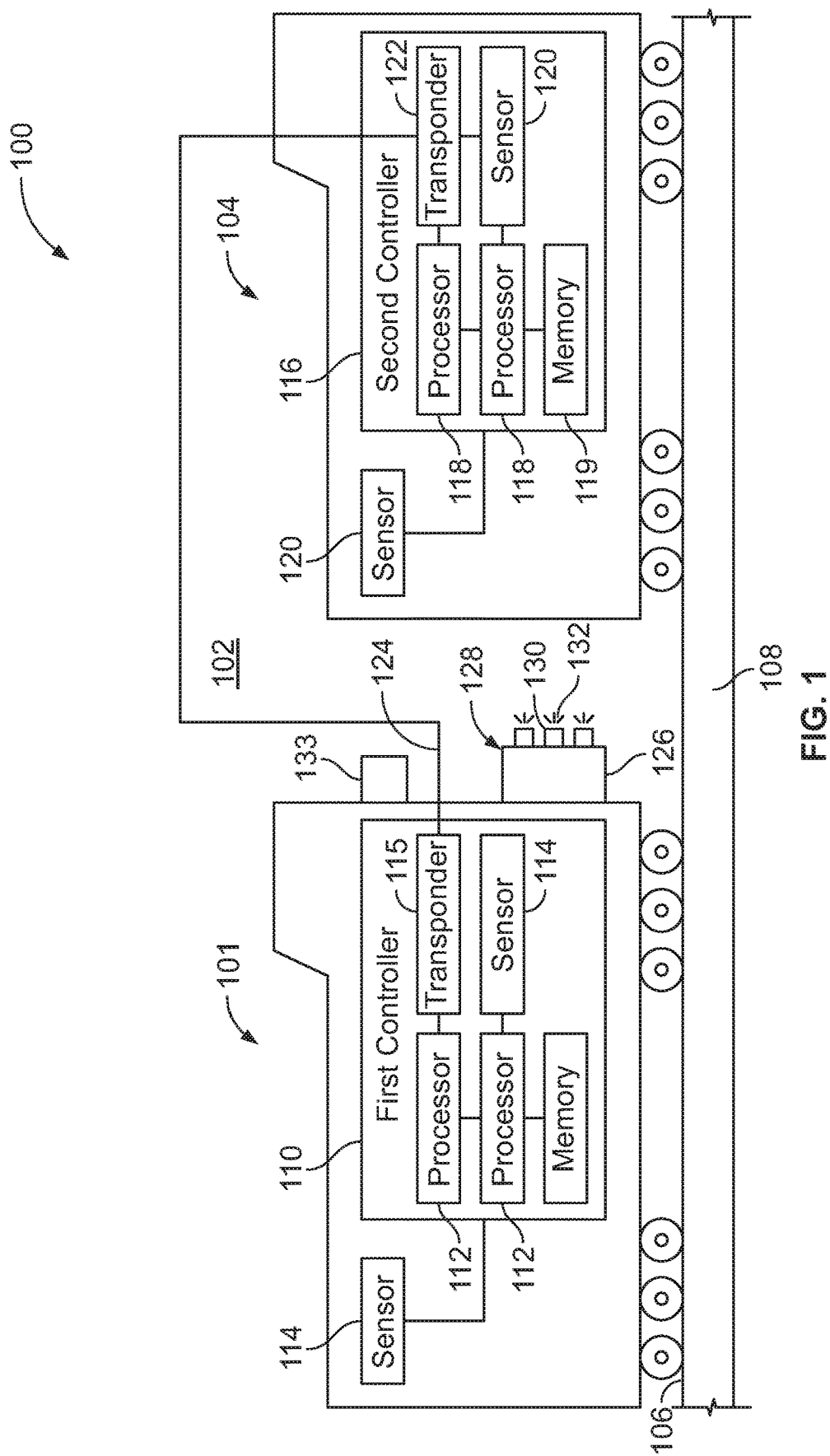
FIG. 1 is a schematic view of a vehicle system in accordance with one embodiment.

FIG. 1 illustrates an example vehicle system 100 that includes a first vehicle 101 in an environment 102 with a second vehicle 104 that each travel along one or more routes 106. In one example, the first vehicle and second vehicle may be rail vehicles where the one or more routes include a track 108. In other embodiments, the first vehicle and/or second vehicle may be another type of vehicle, such as automobiles, trucks, buses, marine vessels, aircraft (manned or unmanned), mining vehicles, agricultural vehicles, off-highway vehicles (OHV) (e.g., a vehicle system that is not legally permitted and/or designed for travel on public roadways), or the like. In particular, the route may support non-rail vehicle applications as non-rail vehicles travel on a road or route, as well as rail vehicle applications for rail vehicles that may move on a track.

The vehicles may be mechanically coupled with each other, such as by couplers. Alternatively, the vehicles in a vehicle system may not be mechanically coupled with each other, but may be logically coupled with each other. For example, the vehicles may be logically coupled with each other by the vehicles communicating with each other to coordinate the movements of the vehicles with each other so that the vehicles travel together in a convoy or group as the vehicle system.

The first vehicle includes a first controller 110 that has one or more processors 112. Each processor may include a microprocessor or equivalent control circuitry. At least one algorithm may operate within the one or more processors.

A memory 113 may be communicatively coupled to the one or more processors. The memory may be an electronic, computer-readable storage device or medium. The controller memory may be housed in the housing of the controller, or alternatively may be on a separate device that is communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like. In an example, the memory may store information that may be used by the PTC protocol, including a starting location, route maps, trip plans, ending location, wheel diameters at starting location, etc.

At least one sensor 114 may also be coupled to the one or more processors. The sensor can receive information and/or monitor conditions to determine a location, movement, and/or distances related to the vehicle. In an example, the at least one sensor of the first vehicle, or one of the sensors of the second vehicle, may be a GPS receiver, a magnetometer, an infrared sensor, lidar, time-of-flight (TOF) sensor, a sound sensor, or the like. In example embodiments, the GPS receiver, or sensor may be used to provide location data associated with the first vehicle. This may include vehicle coordinates, speed data and information, distances data and information, etc. In example embodiments, a magnetometer is provided as a sensor and/or and used to determine whether the vehicle is moving forward or in reverse. In yet another embodiment, an infrared sensor, lidar, radar, time-of-flight (TOF) sensor, etc. is used for detecting positioning, location, and movement of the first vehicle and second vehicle in relation to one another. Similarly, in another example, a doppler, sound sensor, ultrasound sensor, etc. may be utilized. Each is a way to receive information related to the speed, location, distance, or the like, of the second vehicle compared to the first vehicle for determining a notification to be provided. In one example, two or more sensors are presented.

In yet another example, a sensor of the first vehicle may be a vibration sensor that senses the vibration of a rail, ground, etc., and from the vibration may determine speed, location, and/or distance information of the second vehicle in relation to the first vehicle based on the vibrations. By using vibrations, even when the first vehicle does not have a line-of-sight to the second vehicle, the vibration sensor may detect the presence of the second vehicle, and determine parameters related to the second vehicle accordingly. So, even if the second vehicle is on a curved portion of a track, is on another side of a hill, is within a tunnel, etc., the second vehicle, and parameters of the second vehicle may be determined.

The first controller also may include a transponder 115 for receiving and/or broadcasting signals via wired and/or wireless pathways. The transponder may be in the form of a separate receiver and broadcasting device, have only a receiver or broadcasting device, or may be one unit.

The second vehicle may include a second controller 116 that also has one or more processors 118. Optionally, the one or more processors may be coupled to a memory 119, one or more sensors 120 associated with the second vehicle, and may also include a transponder 122 similar to the transponder of the first vehicle. The transponder may provide a communication pathway to the transponder of the first vehicle to provide inputs 124 that may be used by the one or more processors of the first vehicle to make determinations related to the first vehicle in comparison to the second vehicle.

In one example, when the first vehicle and second vehicle may be rail vehicles, the first controller and/or second controller can operate using a PTC protocol. The PTC protocol presents functional requirements for monitoring and controlling the first rail vehicle and second rail vehicle to implement additional safety for each rail vehicle. Under PTC protocol requirements, a rail vehicle receives information about the location of the rail vehicle and where the rail vehicle may safely travel. By using a PTC protocol, the first controller and second controller prevent the corresponding first rail vehicle or second rail vehicle from making unsafe movements. In particular, a controller can use global positioning system (GPS) data obtained by one or more GPS receivers, and communicates with remote vehicles, command center devices, dispatch devices, etc. to make determinations associated with safe travel of the rail vehicle. In one example, at least one of the sensors may be a GPS receiver, and may provide information or data for use under a PTC protocol. Additionally, the first vehicle and second vehicle may use a PTC protocol to communicate and share information with one another regarding a route or routes. Thus, the first controller and second controller may communicate with one another directly, through a third party, etc. to provide information and data associated with each vehicle.

The first vehicle may also include an end of vehicle device 126 that may be coupled to a back end of the first vehicle and is coupled to, and operably controlled by, the first controller. The end of vehicle device in one example, may include one or more of the sensors, or alternatively may be coupled to one or more of the sensors that are remote, or not mechanically coupled to the end of vehicle device.

The end of vehicle device may include a notification light 128 that includes one or more light sources 130 used to alert or communicate with the second vehicle. The end of vehicle device in one example, may be an end of train (EOT) device. While in the example of FIG. 1, only one light source is illustrated, in other examples, a first light source and second light source may be present. In other examples, numerous light sources may be presented. The light sources may be light emitting diodes, filament-based lights, fluorescent-based lights, halogen-based lights, etc. The notification light is operated to not only provide an alert to a driver of the second vehicle, but in addition, to provide information about the first vehicle to the second vehicle based on varying the output of the light sources.

In different examples, the notification light may be varied by the first controller to change a characteristic of the light emitted by the notification light. In particular, the first controller may determine from the one or more sensors, inputs, etc. one or more of the direction of the movement of the first vehicle, the speed of the first vehicle, the distance between the first vehicle and second vehicle, etc. Based on the determination(s), the one or more processors may vary a characteristic of the light emitted by the notification light to produce different outputs 132. Each output provided may represent or convey specific information associated with the first vehicle to provide a driver of the second vehicle with information for making decisions related to operating the second vehicle.

In one example, when a determination is made that the first vehicle is moving at a slower rate than an approaching second vehicle, the one or more processors may vary the output to flash yellow. In particular, a yellow flashing light may indicate the first vehicle is moving slower than the second vehicle, and the second vehicle needs to slow down. In another example, the first vehicle may be stopped or reversing on the track. In this instance the lights may present the word "STOP" in red with a stop sign octagon pattern around the word "STOP" to indicate the second vehicle should also stop. In yet another example, the first vehicle may be traveling at a speed of 60 mph and slows to 50 mph to reduce emissions. When traveling at 60 mph the output may be the color green indicating the vehicle is traveling between 60 mph and 70 mph. When the first vehicle then drops to a speed below 60 mph, the output may turn blue indicating the speed of the first vehicle has reduced to a speed between 50 mph and 60 mph. This change in color not only indicates to the operator of the second vehicle that speed has changed, but also provides information about the actual speed of the first vehicle. In yet another example, the first vehicle may be coming upon a scheduled stop provided in a trip plan of the first vehicle within two miles, and will be slowing down. As a result, the output may be a cross pattern with red and white colors. Each example above is merely exemplary. The colors, patterns, words, flashing, etc. may be different for the above examples than provided above. In particular, varying of the output provides more than just a warning to an operator of a second vehicle, and instead additionally provides specific information such as the traveling speed, vehicle traveling direction, or the like about the first vehicle that allows the operator of the second vehicle to make an informed decision regarding how to operate the second vehicle.

Optionally, a sound generating device 133 may be coupled to the end of vehicle device to be included in the output to alert the driver of the second vehicle that information is available from the notification light. Thus, in situations when the second vehicle temporarily does not have a line-of-sight with the end of the first vehicle, the driver of the second vehicle is alerted to pay attention once line-of-sight is available. The driver of the second vehicle may then begin making decisions as quickly as possible based on information conveyed by the notification light.

Figure 2:
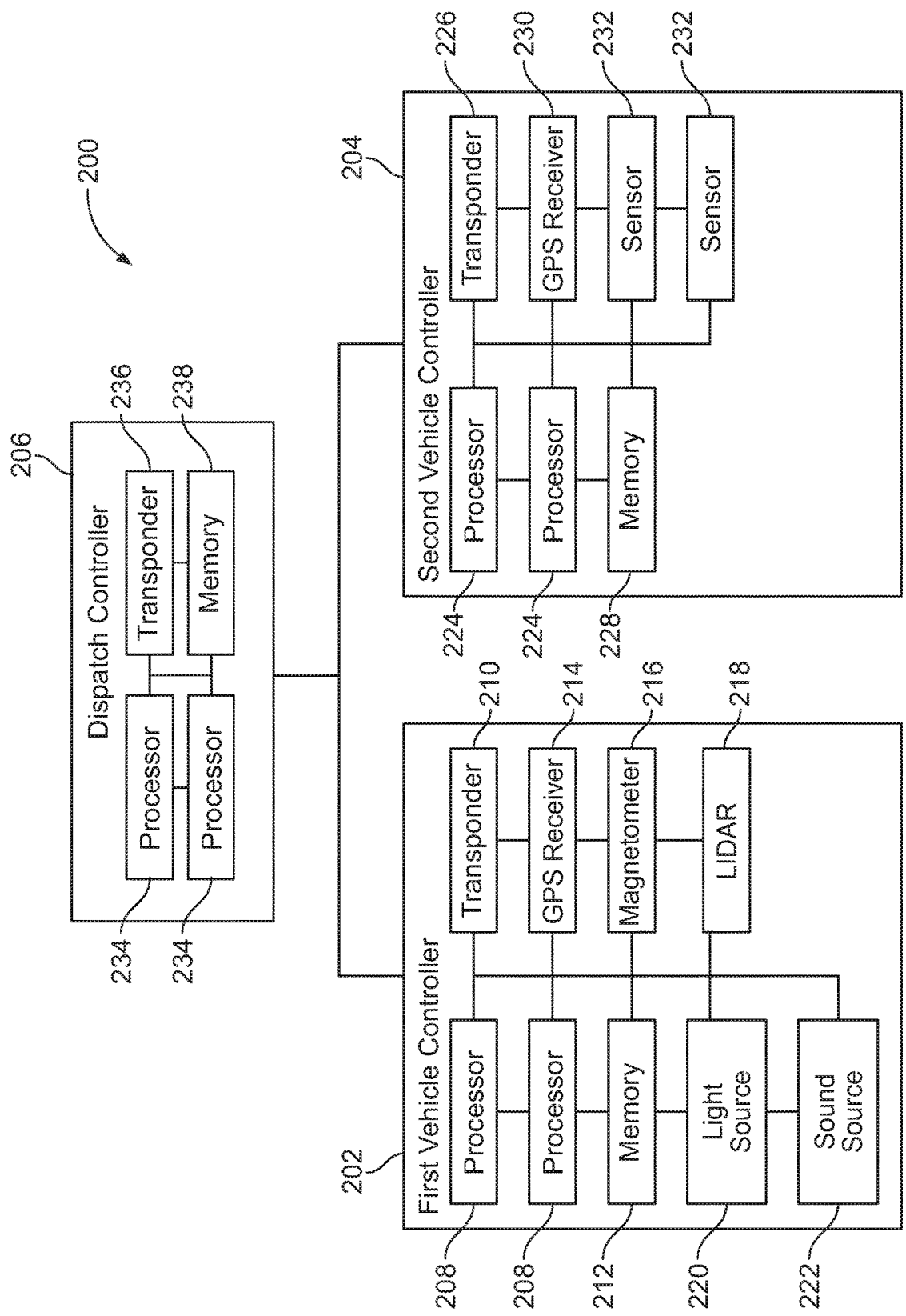
FIG. 2 is a schematic view of a control system of a vehicle system in accordance with one embodiment.

FIG. 2 illustrates a control system 200 that may be used by a vehicle system. In one example, the vehicle system is the vehicle system of FIG. 1. The control system includes a first vehicle controller 202, a second vehicle controller 204, and a dispatch controller 206. The first vehicle controller and second vehicle controller may be controllers for one or more automobiles, marine vessels, aircraft, mining vehicles, agricultural vehicles, off-highway vehicles (OHV) system (e.g., a vehicle system that is not legally permitted and/or designed for travel on public roadways), or the like.

The first vehicle controller may include one or more processors 208, a transponder 210, and memory 212, as described above. The one or more processors may also electrically coupled to, and be in communication with, a global positioning system (GPS) receiver 214, and magnetometer 216. The GPS receiver provides information associated with the location of a first vehicle, speed of the first vehicle, etc. The magnetometer provides information related to the direction of the first vehicle. By using the information from the GPS receiver and magnetometer, in combination with information received by the transponder from the second vehicle controller or dispatch controller, the one or more processors may make determinations related to the distance, speed, direction, movement, etc. of the first vehicle compared to a second vehicle. In particular, distance, speed, direction, movement, etc. of the second vehicle may be communicated from the second vehicle controller or the dispatch controller, and received by the first vehicle controller.

Optionally, the one or more processors may also be electrically coupled to a lidar 218 that provides data related to the distance, speed, movement, etc. of the second vehicle. Alternatively, other sensors, including infrared sensors, time-of-flight (TOF) sensors, vibration sensors, ultrasound sensors, sound sensors, or the like may by electrically coupled and in communication with the one or more processors of the first vehicle controller information related to the second vehicle.

The one or more processors may also be electrically coupled and in communication to operate at least one light source 220. The at least one light source may be operated by the one or more processors to provide an output based on the determinations related to the distance, speed, direction, movement, etc. of the first vehicle compared to a second vehicle. In particular, the light output may be varied to convey information to the operator of the second vehicle. Optionally, the one or more processors may additionally be coupled, and in communication to operate at least one sound source 222. The sound source may be provided to alert the operator of the second vehicle that information is available by viewing the at least on light source.

The second vehicle controller may also include one or more processors 224, a transponder 226, and memory 228. The one or more processors may be electrically coupled to and in communication with a GPS receiver 230, and one or more sensors 232. The GPS receiver and one or more sensors may obtain information associated with the distance, speed, direction, movement, etc. of the second vehicle that may be relayed to the first vehicle controller. The first vehicle controller may then use this information to make determinations related to a lighting output to provide information to the operator of the second vehicle.

The dispatch controller may include one or more processors 234, a transponder 236, and memory 238. The one or more processors may provide information to the first vehicle related to the second vehicle, including a trip plan, location, or the like. Additionally, the dispatch controller may function as a communication conduit between the first vehicle and second vehicle if for any reason information cannot be shared between the two vehicles. Thus, the dispatch controller may provide additional information to the first vehicle controller to use while making determinations associated with the distance, speed, direction, movement, etc. of the second vehicle compared to the first vehicle.

Figure 3:
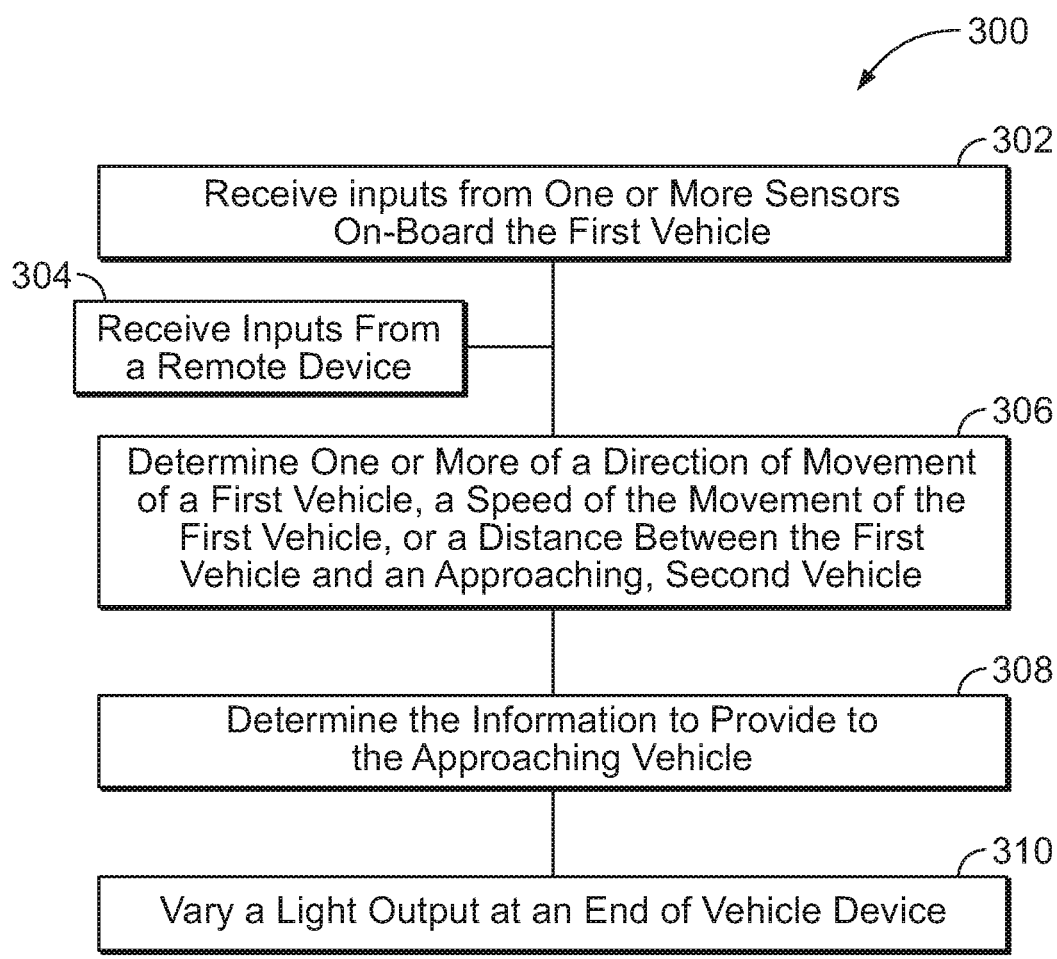
FIG. 3 is a block flow diagram of a method of providing information from an end of vehicle device in accordance with one embodiment.

FIG. 3 illustrates a method 300 of providing information from an end of vehicle device of a first vehicle to an operator of a second vehicle. In one example, the end of vehicle device may be an end of train device. In another example, the end of vehicle device may be the end of vehicle device as described in relation to FIG. 1.

At 302, one or more processors may receive input from one or more sensors on-board the first vehicle. The one or more sensors may include a global position system receiver, a magnetometer, an infrared sensor, lidar, time-of-flight (TOF) sensor, vibration sensor, ultrasound sensor, a sound sensor, or the like. The one or more sensors may collect information associated with the first vehicle, or information associated with the second vehicle.

At 304, optionally, the one or more processors may receive inputs from a remote device. The remote device may be an off-board device. In one example, the one or more processors may receive inputs from a second vehicle controller. In another example, the one or more processors may receive inputs from a dispatch controller. Alternatively, another off-board third party may provide inputs relevant to making determinations regarding the distance, speed, direction, movement, etc. of the second vehicle compared to the first vehicle.

At 306, the one or more processors may determine one or more of a direction of movement of a first vehicle, a speed of the movement of the first vehicle, or a distance between the first vehicle and an approaching, second vehicle based on the inputs received. The determination may be made based on any input provided to the processor. The inputs may include inputs from off-board devices, and on-board devices. When used herein, the speed of the movement is not referring to braking, or deceleration as a result of braking, such as when brake lights go on when a vehicle is braking. Instead, the speed of the movement is referring to the magnitude of the speed. In particular, when brake lights indicate a vehicle is braking, no additional information is conveyed. By determining the speed of the movement, information related to the actual speed of the vehicle may be conveyed. This additional information improves upon typical braking lights of a vehicle.

At 308, the one or more processors may determine the information to provide to the approaching vehicle. The one or more processors may use a look-up table, mathematical equation, algorithm, or the like, to make the determination. In particular, based on the inputs received, the one or more processors may determine to vary a color, persistence, pattern, intensity, etc. of light to provide information with a notification light. Alternatively, the notification light may present a word, or may present some lights on while other lights are off. Each variance represents different information that may be understood by the second operator to make an informed decision regarding the operation of the second vehicle.

At 310, the one or more processors may vary a light output at an end of vehicle device based on the information determined by the one or more processors. The output may be any of the example outputs provided in FIGS. 4-6. The output may also include a sound device such as a horn or siren. In this manner, if the second operator does not have a line-of-sight to see the end of the first vehicle, the sound may alert the second operator to be aware a first vehicle is present, and information is presented. Consequently, the second operator immediately looks for the notification light to determine what action to take.

Figure 4:
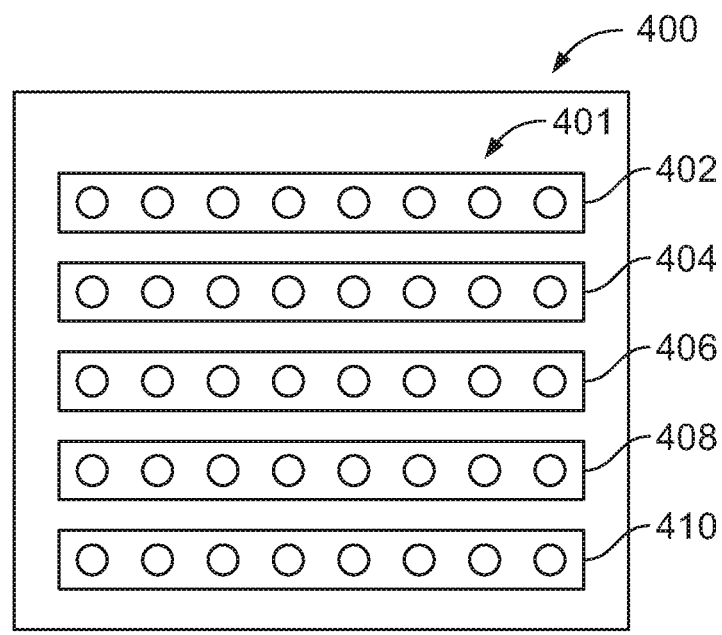
FIG. 4 is a front plan view of a notification light in accordance with one embodiment.

FIG. 4 illustrates an example end of vehicle device 400. The end of vehicle device in one example may be the end of vehicle device illustrated in FIG. 1. The end of vehicle device may include a notification light 401 that has a first light source 402 that emits red light, a second light source 404 that emits orange light, a third light source 406 that emits yellow light, a fourth light source 408 that emits green light, and a fifth light source 410 that emits blue light. In an example, each light source includes light emitting diodes. In another example, filament lighting, halogen lighting, fluorescent lighting, or the like may be used. While five different light sources are presented, in other embodiments, only two light sources may be provided, whereas in other embodiments, more than five light sources may be provided. While the colors red, orange, yellow, green, and blue are described, in other examples only red, green, and blue are provided. Alternatively, other colors may be used, and other combinations of colors may be used. Similarly, infrared light sources, or ultraviolet light sources may also be used that may be detected by one or more sensors of a second vehicle in situations when line-of-sight viewing may be difficult, including when fog, or smog, is present.

In one example, each different color may represent a different speed range of the first vehicle. In such an example, red may be between 0-20 mph, orange between 20-40 mph, yellow between 40-55 mph, green between 55-70 mph, and blue over 70 mph. In one example, the shade of the color may change as the speed of the vehicle varies. Thus, when at 0 mph the first light source 402 may emit a deep red, and as the vehicle approaches 20 mph, the first light source become more orange, until finally at 20 mph, the first light source turns off, and the second light source begins emitting orange light.

In another example, the colors of the light sources may not represent a speed of the vehicle, and instead may represent other information. As an example, red may represent the vehicle is stopped, while yellow represents that a vehicle is moving in reverse. Blue may represent that a vehicle has been blue flagged, whereas green may represent that the vehicle will be stopping at a next available stopping point. Thus, by changing and varying the colors of the end of vehicle notification light, information may be provided to a second operator to improve decision making of the second operator.

Figure 5:
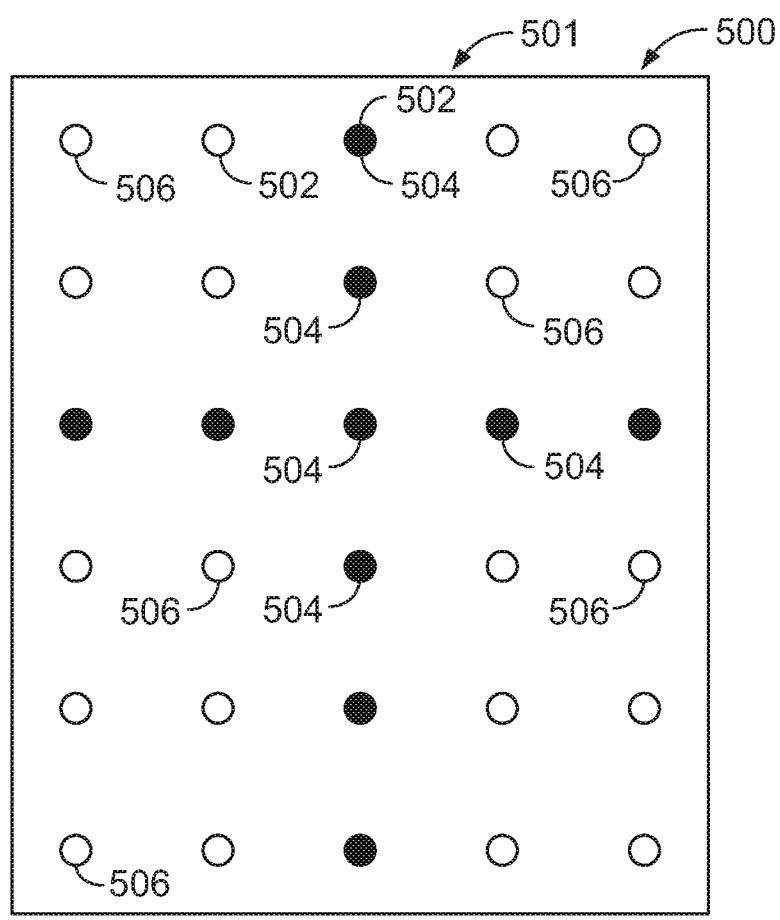
FIG. 5 is a front plan view of a notification light in accordance with one embodiment.

FIG. 5 illustrates the notification light, that may include a pattern. Specifically, the end of vehicle device 500 may include a notification light 501 that may have numerous light sources 502. One or more processors of a vehicle controller may then form a pattern with the light sources by having a combination of light emitting light sources 504 and non-light emitting light sources 506. In one example, the pattern may be a cross. In another example, the pattern may be an octagon representative of a stop sign that indicates the first vehicle is stopped. Alternatively, the pattern may be another shape such as a triangle, that may represent a speed of a vehicle. Specifically, instead of using colors to represent speed, shapes may be used. In other examples, the pattern may present a color pattern, such as a rainbow that may indicate a vehicle is changing direction. In other examples, a flashing pattern, such as a flashing octagon may represent a vehicle will be stopping, but is not yet stopped. In another example, the pattern may be a 2D or 3D barcode that conveys information based on the pattern. In one example, a constant, dynamic bar code is provided that a bar code reader receives real time operational data form, including location, speed, heading, upcoming changes to speed or heading, a time or date stamp, vehicle type, brake condition or expected stopping capability, load/weight, etc. Thus, the pattern changes as the parameters or characteristics of the vehicle change. The pattern changes may be achieved by activating and deactivating different light sources, varying intensity within individual light sources, etc. Again, the notification light is providing information related to the first vehicle for an operator of a second vehicle to see or use.

Figure 6:
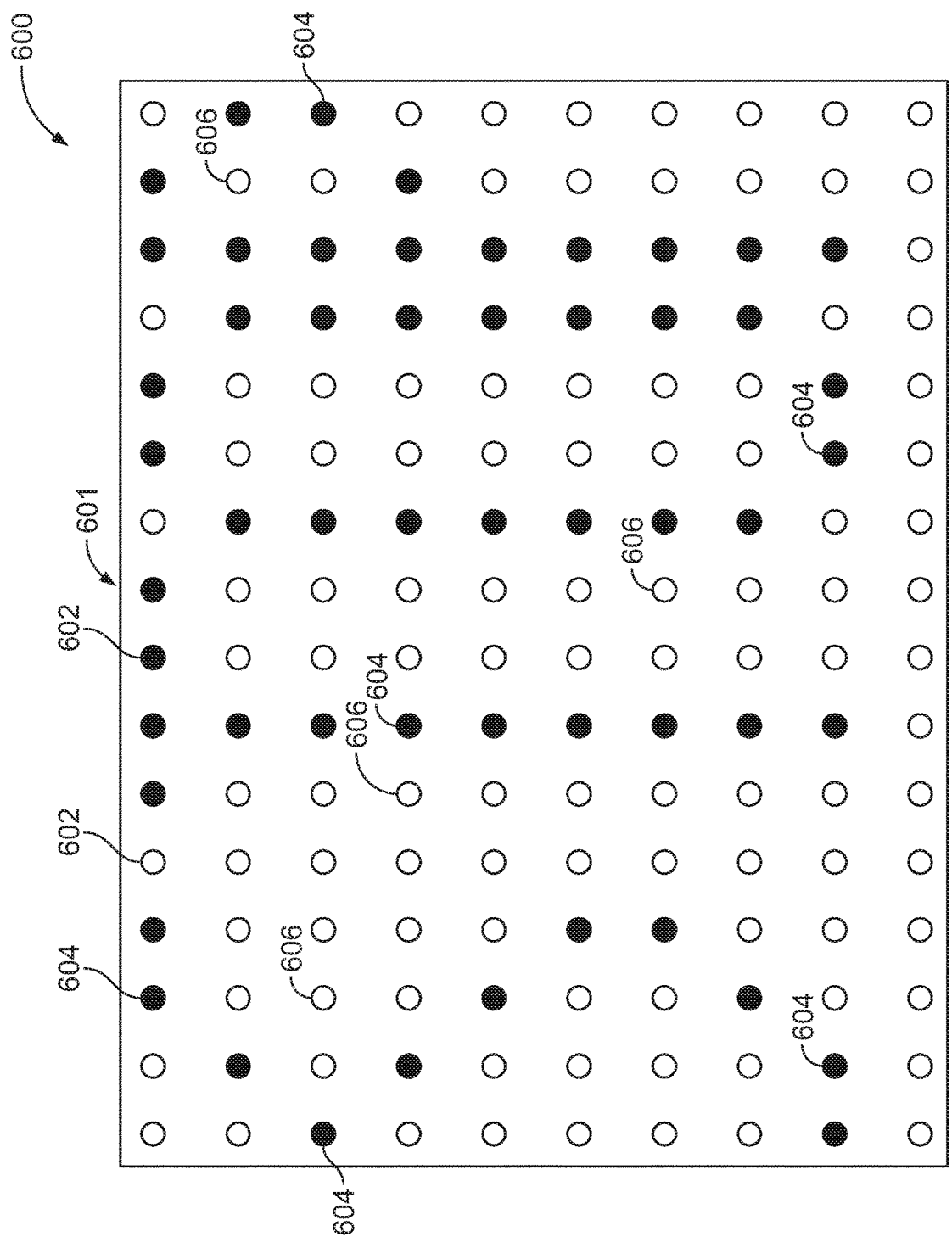
FIG. 6 is a front plan view of a notification light in accordance with one embodiment.

FIG. 6 illustrates another end of vehicle device 600 with a notification light 601. In this example the light sources 602 may present light emitting light sources 604 and non-light emitting light sources 606 that illuminate the word "STOP". This notifies an approaching train that the first vehicle is stopped. Other words may similarly be used such as "SLOW", "REVERSE", etc. Numbers may also be used, including providing the moving speed of the first vehicle in mph at all times. Again, an operator of the second vehicle is able to see the numbers and instantly be conveyed information that assists in operating the second vehicle. Also, a single light notification device may be able to present different colors, patterns, words, etc. as desired, including changing between colors, patterns, words, etc. Similarly, a light notification device may use a color, pattern, and word simultaneously. For example, the word "STOP" may be displayed in white, with an octagon pattern around the word, and red lights emitting light within the octagon.

FIGS. 7-10 illustrate example embodiments related to the functioning of an end of vehicle device. The embodiments include how an end of vehicle device may operate in conjunction with other system of a vehicle system.

According to non-limiting embodiments, provided in FIGS. 7-10 is an indicator control system for a vehicle system that includes multiple vehicles coupled together. In one example, the vehicle system may include a lead locomotive coupled to a rear car that includes an end of vehicle device. While illustrated as just the lead locomotive and rear car, in other examples, numerous other cars may be coupled between the lead locomotive and rear car, including other locomotives. The indicator control system may include an interface onboard the at least one locomotive. The interface may be configured to broadcast at least one control signal based on at least one of an environmental condition, hazardous condition, a type of cargo associated with the train, a time and location of the train, a PTC signal, an electronic train management system signal, an authorized trigger, a manual input, any combination thereof, and/or the like. A device for attachment to the lead locomotive may include the end of vehicle device. A controller may be part of or coupled to the end of vehicle device a described above. The controller may be configured to receive the control signal(s) from the interface and to vary the light output of the end of vehicle device based on a control signal(s).

Figure 7:
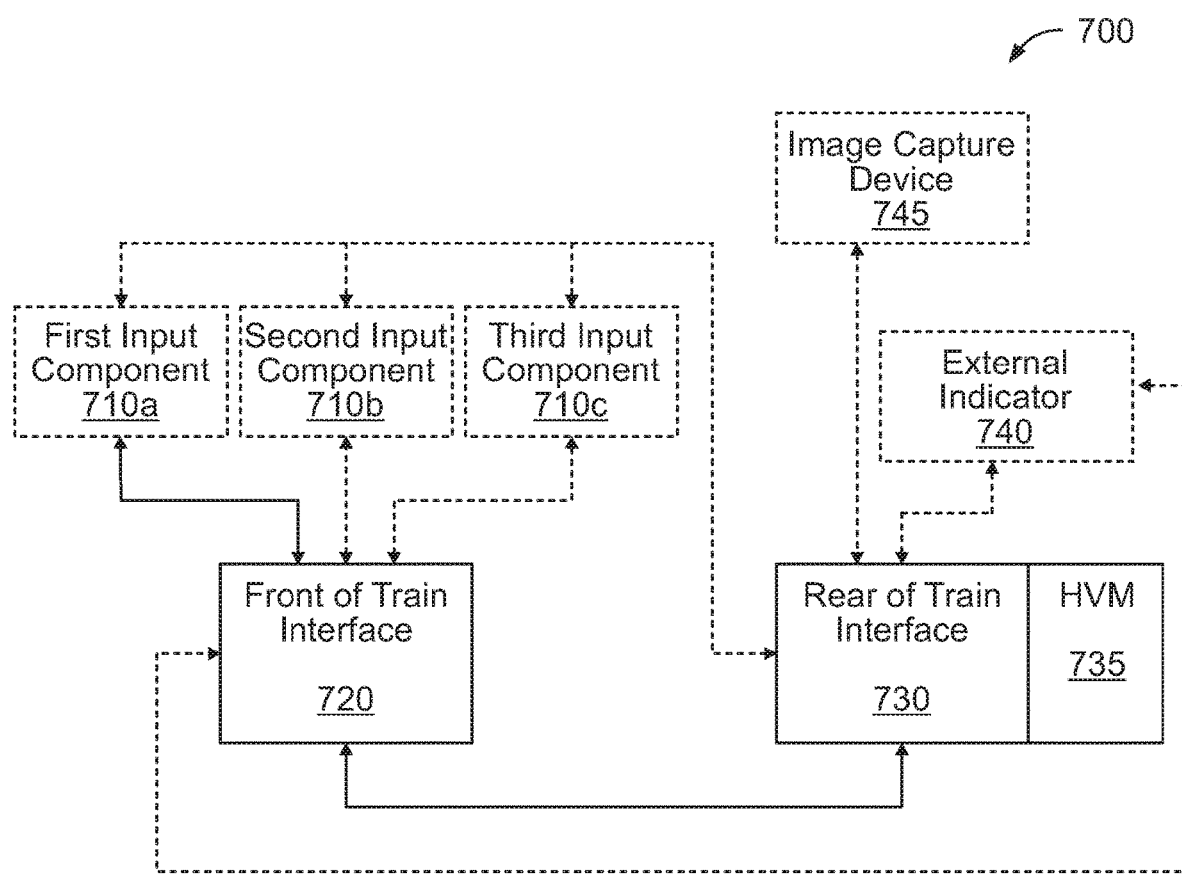
FIG. 7 is a schematic block diagram of a vehicle system in accordance with one embodiment.

FIG. 7 is a diagram of an example embodiment of a vehicle system 700 is provided. The vehicle system may include at least one input component 710a, 710b, 710c; a front of vehicle device 720; an end of vehicle device 730; a high visibility marker 735; an external indicator 740; and/or an image capture device 745. Systems and/or devices of the vehicle system may interconnect via wired connections, wireless connections, or a combination of wired and wireless connections. For example, systems and/or devices of the vehicle system may interconnect via one or more wired and/or wireless networks, where the one or more wired and/or wireless networks may include a cellular network (e.g., a long-term evolution (LTE) network, a third generation (3G) network, a fourth generation (4G) network, a fifth generation (5G) network; a code division multiple access (CDMA) network, etc.), a public land mobile network (PLMN), a local area network (LAN), a wide area network (WAN), a metropolitan area network (MAN), a telephone network (e.g. the public switched telephone network (PSTN)), a private network, an ad hoc network, an intranet, the Internet, a fiber optic-based network, a cloud computing network, an Association of American Railroads (AAR) wireless communication system (e.g. AAR Wireless Communication Committee (WCC) standard and/or the like), and/or a combination of these or other types of networks.

In one example embodiment, an end of vehicle device may include a visual indicator, e.g. a light source. For example, the light source may include at least one of an illumination fixture, a light emitting assembly, a light bulb, a light emitting diode, a laser, an infrared light source, an ultraviolet light source, a visible light source, and/or the like.

In an example embodiment, the end of vehicle device may include the high visibility marker. For example, the high visibility marker may be integrated with or coupled to the end of vehicle device. In an example embodiment, the end of vehicle device may be coupled to a trailing coupler of the rear car of a vehicle system. The end of vehicle device may include the external indicator. For example, the external indicator may include a visual indicator (e.g., a light source) separate from the high visibility marker of end of vehicle device. In one example embodiment, the external indicator may be disposed proximate to a trailing end of a rear car. Additionally or alternatively, the external indicator may be removably coupled to the end of vehicle device.

In an example, the front of vehicle device may include an operator interface. Additionally or alternatively, front of vehicle device may include at least one of a head of train (HOT) device, a positive train control (PTC) device, or an electronic train management system (ETMS) device. In some example embodiments, front of vehicle device may be configured to receive inputs and/or control signals from a remote server (e.g., PTC server or ETMS server).

The front of vehicle device may include and/or receive inputs from at least one input component. For example, the first input component may be a user input (e.g., a touch screen display, a keyboard, a keypad, a mouse, a button, a switch, a microphone, etc.), such as from an operator and/or crew member of a rail vehicle. For example, the front of vehicle device may receive at least one control signal from and/or generate at least one control signal based on first input component or protocol (e.g., PTC or ETMS).

In some example embodiments, the vehicle system may include one or more additional input components/interfaces, such as second input component (e.g., PTC or ETMS), third input component (e.g., sensors, other authorized triggers, and/or the like), through nth input component (not shown). For example, the front of the vehicle device may receive at least one control signal from and/or generate at least one control signal based on second input component (e.g., PTC or ETMS). Additionally or alternatively, the front of the vehicle device may receive at least one control signal from and/or generate at least one control signal based on third input component (e.g., e.g., a sensor, an authorized trigger, and/or the like). In some non-limiting embodiments, third input component (e.g., a sensor) may include at least one of a speed sensor, a location sensor, a clock, any combination thereof, and/or the like.

In some example embodiments, the front of the vehicle device may receive at least one control signal from and/or generate at least one control signal based on conditions related to the rail vehicle. For example, the front of the vehicle device may receive at least one control signal from and/or generate at least one control signal based on at least one of an environmental condition, a hazardous condition, a type of cargo associated with the train, a time and location of the train, a PTC protocol, an ETMS, an authorized trigger, a sensor, a manual input, and/or the like.

In some example embodiments, the front of the vehicle device may display an indication of the state of the indicator (e.g., high visibility marker, external indicator, and/or the like). For example, front of the vehicle device may include a display screen, and a status of the indicator may be indicated by text and/or graphics in at least a portion of the display screen. Additionally or alternatively, the front of the vehicle device may include a visual indication of the status of the indicator (e.g., one or more lights, dials, and/or the like). Additionally or alternatively, the front of the vehicle device may indicate the state of the indicator in a non-visual manner, e.g., an audible indication (e.g., a noise, a tone, a chime, and/or the like from a speaker, a bell, and/or the like).

In some example embodiments, front of the vehicle device may include a communication interface (e.g., wired or wireless communication interface). Additionally or alternatively, the end of vehicle device may include a communication interface (e.g., wired or wireless communication interface). In some example embodiments, the front of the vehicle device may communicate with the end of vehicle device via respective communication interfaces thereof. In some example embodiments, the front of the vehicle device (e.g., a communication interface of the front of the vehicle device) may communicate directly with the external indicator (e.g., a communication interface of the external indicator), image capture device (e.g., a communication interface of image capture device), other components, devices, and/or systems of the vehicle system, and/or the like independent of end of vehicle device.

In some example embodiments, the control signal(s) may include at least one first control signal from third input component (e.g., at least one sensor and/or the like) and at least one second signal from at least one of first input component (e.g., an operator interface, an HOT device, and/or the like) and/or second input component (e.g., a PTC device, an ETMS device, and/or the like). Additionally or alternatively, such first control signal(s) may be overridden in response to the second control signal(s).

In some example embodiments, the control signal(s) may include at least one digital signal. For example, a digital signal may include at least one of a message (e.g., packet, frame, and/or the like of data, information, and/or the like), a code word, a bit, a sequence of bits, a bit stream, and/or the like. Additionally or alternatively, the control signal(s) may include an analog signal (e.g., an electrical signal, an electromagnetic signal, and/or the like). In some example embodiments, the control signal(s) may include an interruption in a digital or analog signal (e.g., a temporary or permanent disconnection, a modulation, and/or the like).

In some example embodiments, an indicator (e.g., high visibility marker, external indicator, and/or the like) may be controlled by a controller. For example, the controller may be integrated with the end of vehicle device. Additionally or alternatively, the controller may be integrated with a front of the vehicle device (e.g., an HOT device, an operator interface, a PTC, an ETMS, and/or the like). Additionally or alternatively, the controller may be at least partially separate from and front of the vehicle device and the end of vehicle device. In some non-limiting embodiments, the controller may be configured to change a state of the indicator based on control signals (e.g., from the front of the vehicle device, the end of vehicle device, remote servers (such as PTC or ETMS servers), and/or the like). Additionally or alternatively, if multiple control signals are received at the controller, the controller may be configured to override at least one first control signal (e.g., from third input component) in response to at least one second control signal (e.g., from first input component and/or second input component), as described herein.

In some example embodiments, the state of the indicator (e.g., high visibility marker, external indicator, and/or the like) may include at least one of an off state or an on state. For example, the indicator (e.g., high visibility marker, external indicator, and/or the like) may be a light source, and an off state may be associated with the light source not radiating any light. Additionally or alternatively, an on state may be associated with the light source radiating light. In some non-limiting embodiments, the state of the indicator (e.g., high visibility marker, external indicator, and/or the like) may include a brightness level. For example, the indicator (e.g., high visibility marker, external indicator, and/or the like) may have multiple possible levels of brightness (e.g., when in the on state). In some non-limiting embodiments, the brightness levels may include a first (e.g., lowest, default, and/or the like) brightness state and at least one second (e.g., enhanced) brightness state brighter than the first brightness state. In some non-limiting embodiments, the indicator (e.g., high visibility marker, external indicator, and/or the like) may include a plurality of possible states, each of the plurality of possible states associated with at least one condition associated with the rail vehicle (e.g., an environmental condition, a hazardous condition, a type of cargo associated with the train, a time and location of the train, a positive train control (PTC), an electronic train management system (ETMS), an authorized trigger, or a manual input). For example, each of the possible states may include a different number of lights on the indicator (e.g., high visibility marker, external indicator, and/or the like), a different color or combination of colors of lights on the indicator, a different pattern of flashing of the lights of the indicator, and/or the like.

In some example embodiments, the image capture device may be provided by the indicator (e.g., at least one of high visibility marker or external indicator), e.g., by turning on the indicator and/or changing a state of the indicator to an enhanced brightness state sufficient to illuminate at least part of a view area of image capture device. In some example embodiments, the image capture device may be interconnected with end of vehicle device. Additionally or alternatively, image capture device may be interconnected, directly or indirectly (e.g., via the end of vehicle device), to the front of the vehicle device. In some example embodiments, image capture device includes one or more devices capable of detecting an image (e.g., image data associated with an image of one or more tracks, image data associated with an image of a set of parallel tracks, etc.), capturing image data associated with the image, and/or communicating the image data that is captured (e.g., communicating the image data to the front of the vehicle device and end of vehicle device. For example, image capture device may include an image sensor, a device that includes an image sensor, a camera (e.g., a digital camera, an infrared camera, an ultraviolet camera, etc.), a video recorder, a video camera, and/or the like.

In some non-limiting embodiments, the front of the vehicle device may display an image and/or video captured by image capture device. For example, front of the vehicle device may include a display screen, and the image and/or video captured by image capture device may be displayed in at least a portion of the display screen.

The number and arrangement of systems shown in FIG. 7 are provided as an example. There may be additional systems, devices and/or networks, fewer systems, devices, and/or networks, different systems, devices and/or networks, or differently arranged systems, devices, and/or networks than those shown in FIG. 7. Furthermore, two or more systems or devices shown in FIG. 7 may be implemented within a single system or a single device, or a single system or a single device shown in FIG. 7 may be implemented as multiple, distributed systems or devices. Additionally or alternatively, a set of systems or a set of devices (e.g., one or more systems, one or more devices) of a vehicle system perform one or more functions described as being performed by another set of systems or another set of devices of the vehicle system.

Figure 8:
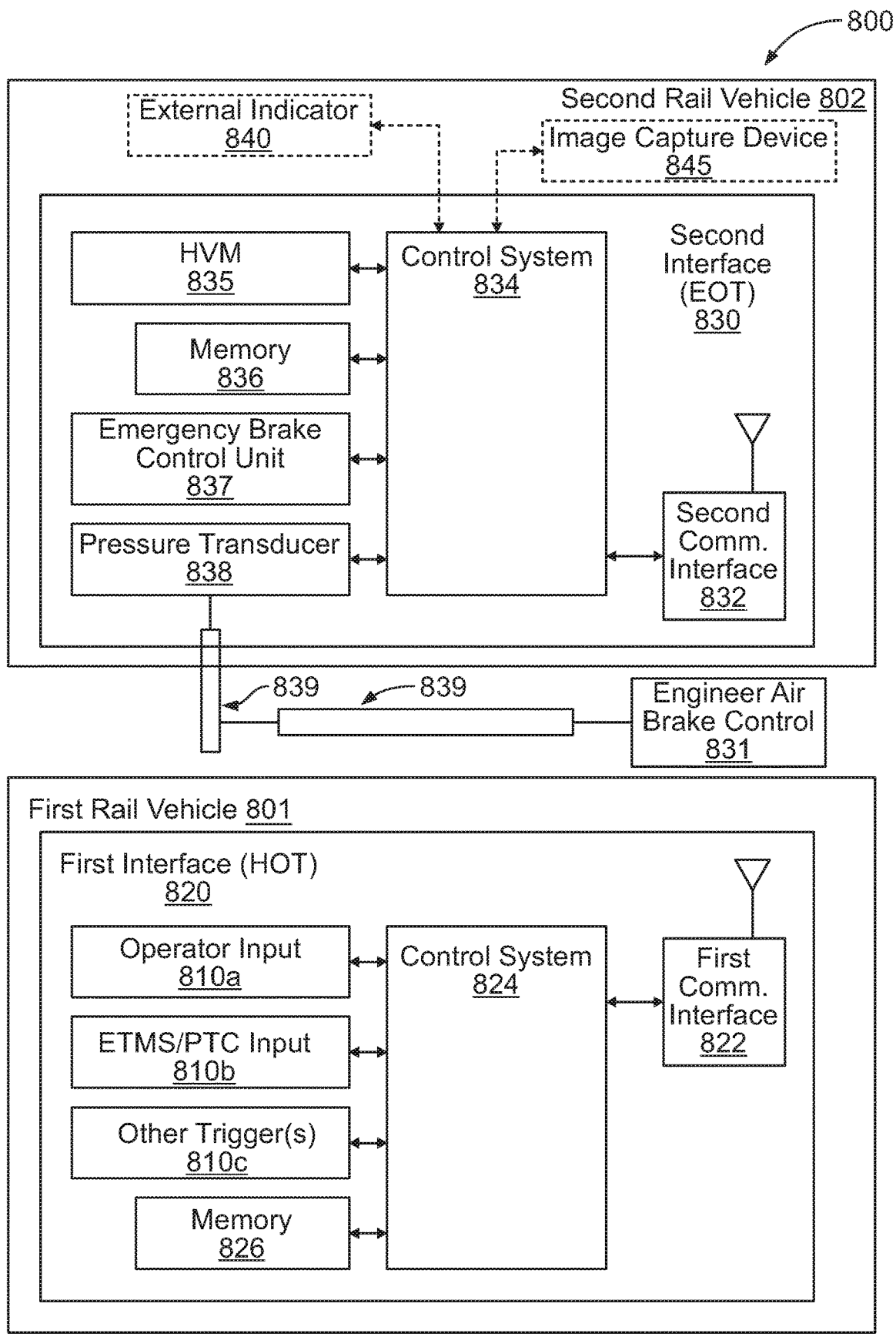
FIG. 8 is a schematic block diagram of a rail vehicle system in accordance with one embodiment.

Referring now to FIG. 8, FIG. 8 is a diagram of an example embodiment of a rail vehicle system 800 for controlling an indicator. As shown in FIG. 2, a first rail vehicle 801 (e.g., front car of a rail vehicle, such as a locomotive or control car) may include a front of the vehicle device 820 (e.g., HOT, PTC, ETMS, operator interface, and/or the like). In some example embodiments, the first front of the vehicle device may be the same as, or similar to, the front of the vehicle device of FIG. 7. The front of the vehicle device may include at least one input component, e.g., first input component 810*a* (e.g., operator input and/or the like), second input component 810*b* (e.g., PTC input, ETMS input, and/or the like), third input component 810*c* (e.g., sensors, other authorized triggers, and/or the like), and/or the like. In some example embodiments, first input component, second input component, and third input component may be the same as, or similar to, first input component, second input component, and third input component, respectively. Additionally or alternatively, the front of the vehicle device may include a memory 826 and control system 824. In some example embodiments, the control system and/or memory may be the same as, or similar to, at least part of a controller of an indicator (e.g., high visibility marker 835, external indicator 840, and/or the like), as described herein. In some example embodiments, front of the vehicle device may further include first communication interface 822 (e.g., a wired or wireless transceiver). In some non-limiting embodiments, first communication interface may be the same as, or similar to, the communication interface of the front of the vehicle device of FIG. 7.

A second rail vehicle 802 (e.g., rear car of a rail vehicle) may include end of vehicle device 830. In some non-limiting embodiments, end of vehicle device may be the same as or similar to end of vehicle device of FIG. 7. In some non-limiting embodiments, end of vehicle device may include the high visibility marker. In some example embodiments, the high visibility market may be the same as or similar to the high visibility marker of FIG. 7. Additionally or alternatively, the second rail vehicle may include an external indicator 840. In some non-limiting embodiments, external indicator may be the same as or similar to external indicator of FIG. 7. In some non-limiting embodiments, the external indicator may be coupled to, in communication with, and/or removably connected to end of vehicle device.

In some example embodiments, second rail vehicle may include an image capture device 845. In some example embodiments, the image capture device may be the same as or similar to the image capture device of FIG. 7. Additionally or alternatively, the front of the vehicle device may include a memory 836 and control system 834. In some example embodiments, the control system and/or memory may be the same as, or similar to, at least part of a controller of an indicator, as described in relation to FIG. 7. In some example embodiments, the end of vehicle device may further include a second communication interface 832 (e.g., a wired or wireless transceiver). In some example embodiments, the second communication interface may be the same as or similar to the communication interface of FIG. 7.

In some example embodiments, end of vehicle device may be mounted on a trailing coupler of the last rail vehicle in a rail vehicle system (e.g., a plurality of rail vehicles connected together, a train, a train of cars, etc.) and the end of the rail device may be equipped with at least one device (e.g., sensor) for monitoring the pressure of a brake system of the rail vehicle system and/or a telemetry device. For example, the end of vehicle device may include a pressure transducer 838 that is connected to air brake coupling 839 and the control system.

In some example embodiments, the control systems may receive telemetry information (e.g., position information, GPS position information, etc.). For example, such telemetry information may be received via an input component (e.g., PTC device, ETMS device, and/or the like) or another input component (e.g., sensors, other authorized triggers, and/or the like). Additionally or alternatively, such telemetry information may be associated with a rail vehicle. In some example embodiments, the control systems may affect the operation of the rail vehicle based on the telemetry information. For example, a control system may cause a brake system of the rail vehicle to be activated based on the telemetry information.

In some example embodiments, the end of vehicle device may communicate with (e.g., send information to and receive information from) the front of the vehicle device and vice versa via a communication link (e.g., a short range communication link) between the first communication interface (e.g., first transceiver) and the second communication interface (e.g., second transceiver). For example, the end of vehicle device may communicate position information relating to a position of a rail vehicle (e.g., position information relating to a position of a rail vehicle derived from a Global Positioning System (GPS) receiver of the rail vehicle) to the front of the vehicle device via the communication link between first communication interface (e.g., first transceiver) and second communication interface (e.g., second transceiver). In some non-limiting embodiments, the communication link may operate with a bandwidth of 450 Mhz.

In some example embodiments, control systems may receive control signals associated with at least one input component, as described herein. For example, a control system may receive at least one input and/or control signal associated with at least one input component. Additionally or alternatively, a control system may generate at least one control signal(s) based on the input(s). In some example embodiments, a control system may communicate the control signal(s) via first communication interface to an end of vehicle device. Additionally or alternatively, second communication interface may receive the control signal(s). In some example embodiments, the control signal(s) may be generated based on at least one of an environmental condition, a hazardous condition, a type of cargo associated with the train, a time and location of the train, a PTC, an ETMS, an authorized trigger, a manual input, and/or the like, as described herein.

In some example embodiments, the control systems may change the state of an indicator (e.g., high visibility marker, external indicator, and/or the like) based on the control signal(s), as described herein. For example, a control system may receive the control signals via the second communication interface coupled thereto. Additionally or alternatively, control system may be coupled to the indicator. Additionally or alternatively, a control system may change a state (e.g., on, off, first brightness, second/enhanced brightness, one of a plurality of different states, and/or the like) of the indicator, as described herein.

Figure 9:
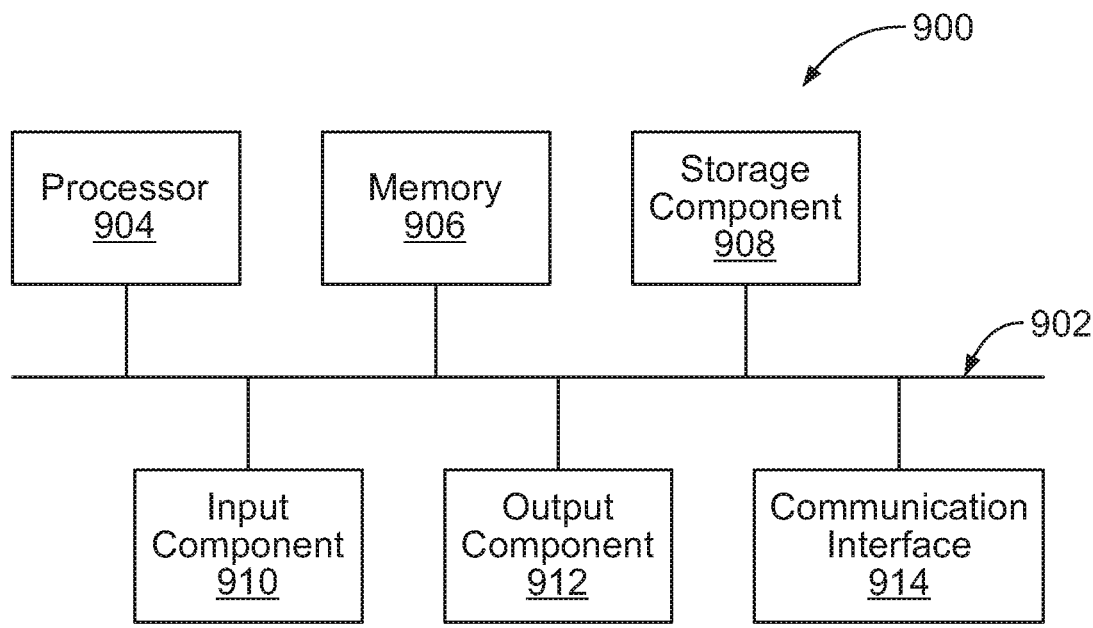
FIG. 9 is a schematic block diagram of component of one or more devices of FIGS. 7 and 8 in accordance with one embodiment.

Referring now to FIG. 9, FIG. 9 is a diagram of example components of a device 900. The device corresponds to one or more devices of the vehicle system of FIG. 7 (e.g., input components, front of the vehicle device, end of vehicle device, high visibility marker, external indicator, and/or image capture device) and/or one or more devices of the system of FIG. 8 (e.g., front of the vehicle device, input components, control systems, memories, first communication interface, end of vehicle device, emergency brake control unit, pressure transducer, air brake coupling, engineer air brake control, high visibility marker, external indicator, image capture device, and/or second communication interface). In some example embodiments, one or more devices of the vehicle system of FIG. 7 and/or system of FIG. 8 may include at least one device and/or at least one component of device. As shown in FIG. 9, the device may include a bus 902, processor 904, memory 906, storage component 908, input component 910, output component 912, and communication interface 914.

The bus may include a component that permits communication among the components of device. In some example embodiments, the processor may be implemented in hardware, firmware, software, or any combination thereof. For example, the processor may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 may include a random access memory (RAM), a read-only memory (ROM), and/or another type of dynamic or static storage device (e.g., flash memory, magnetic memory, optical memory, etc.) that stores information and/or instructions for use by the processor.

The storage component may store information and/or software related to the operation and use of the device. For example, the storage component may include a hard disk (e.g., a magnetic disk, an optical disk, a magneto-optic disk, a solid state disk, etc.), a flash memory, a compact disc (CD), a digital versatile disc (DVD), a floppy disk, a cartridge, a magnetic tape, and/or another type of computer-readable medium, along with a corresponding drive.

The input component may include a component that permits the device to receive information, such as via user input (e.g., a touch screen display, a keyboard, a keypad, a mouse, a button, a switch, a microphone, etc.). Additionally or alternatively, the input component may include a sensor for sensing information (e.g., a GPS component, an accelerometer, a gyroscope, an actuator, a light sensor, a barometer, a thermometer, a speed sensor (e.g., speedometer), a clock, etc.). An output component may include a component that provides output information from the device (e.g., a display, a speaker, one or more light-emitting diodes (LEDs), etc.).

The communication interface may include a transceiver-like component (e.g., a transceiver, a separate receiver and broadcasting device, etc.) that enables the device to communicate with other devices, such as via a wired connection, a wireless connection, or a combination of wired and wireless connections. The communication interface permits the device to receive information from another device and/or provide information to another device. For example, the communication interface may include an Ethernet interface, an optical interface, a coaxial interface, an infrared interface, a radio frequency (RF) interface, a universal serial bus (USB) interface, a Wi-Fi interface, a cellular network interface, and/or the like.

In some example embodiments, the device performs one or more processes described herein. In some example embodiments, the device performs these processes based on processor executing software instructions stored by a computer-readable medium, such as a memory and/or a storage component. A computer-readable medium (e.g., anon-transitory computer-readable medium) is defined herein as a non-transitory memory device. A memory device includes memory space located inside of a single physical storage device or memory space spread across multiple physical storage devices.

Software instructions may be read into a memory and/or a storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 9 are provided as an example. In some non-limiting embodiments, the device includes additional components, fewer components, different components, or differently arranged components than those shown in FIG. 9. Additionally or alternatively, a set of components (e.g., one or more components) of the device performs one or more functions described as being performed by another set of components of the device.

Figure 10:
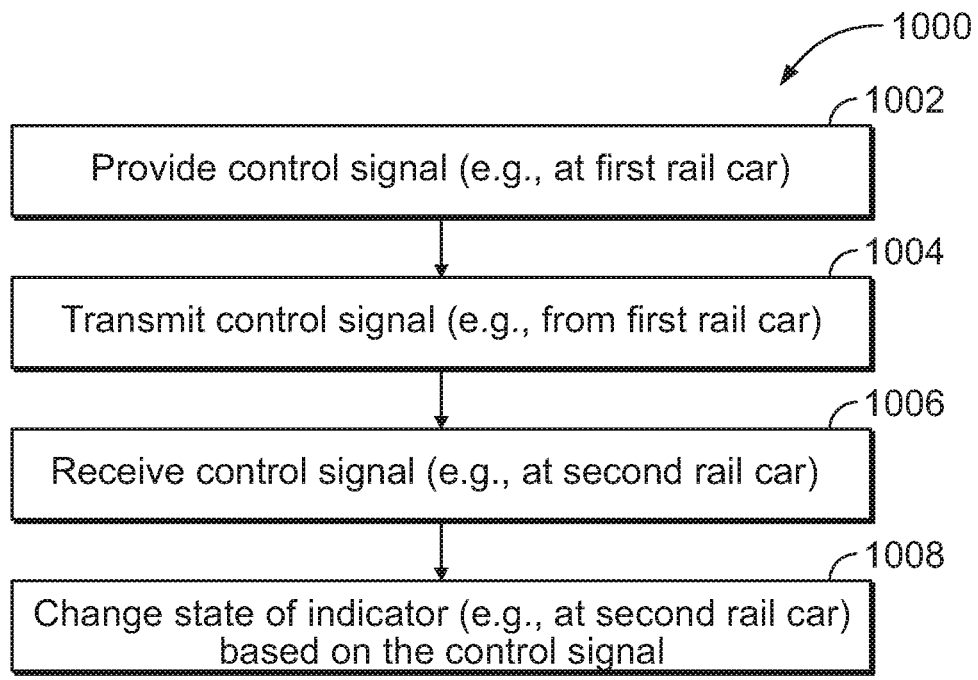
FIG. 10 is a block flowchart of a process for controlling an indicator in accordance with one embodiment.

Referring now to FIG. 10, FIG. 10 is a flowchart of a non-limiting embodiment of a process 1000 for controlling an indicator. In some non-limiting embodiments, one or more of the steps of the process may be performed (e.g., completely, partially, etc.) by the end of vehicle devices of FIGS. 7 and 8. In some non-limiting embodiments, one or more of the steps of the process may be performed (e.g., completely, partially, etc.) by another device or a group of devices separate from or including the front of the vehicle device, a high visibility marker, external indicator, one or more components or devices of the vehicle system, one or more components or the devices of the system of FIG. 8, and/or the like.

At step 1002, one or more processors may provide at least one control signal. For example, an front of the vehicle device proximate to a front of a rail vehicle may receive the control signal(s) from and/or generate the control signal(s) based on inputs (e.g., input components, and/or a remote server (e.g., PTC server, ETMS server, and/or the like)), as described herein. In some example embodiments, the control signal(s) may be based on at least one of an environmental condition, a hazardous condition, a type of cargo associated with the train, a time and location of the train, a PTC, an ETMS, an authorized trigger, a manual input, and/or the like, as described herein. Additionally or alternatively, an end of vehicle device proximate to a rear of the rail vehicle may receive the control signal(s) from and/or generate the control signal(s) based on inputs, and/or a remote server (e.g., PTC server, ETMS server, and/or the like)), as described herein.

In some example embodiments, the front of the vehicle device may include at least one of an operator interface, a HOT device, a PTC device, an ETMS device, and/or the like, as described herein. Additionally or alternatively, the inputs may be at least one of operator input, PTC input, ETMS input, sensor input, other authorized triggers, and/or the like, as described herein.

In some example embodiments, the control signal(s) may include at least one of a digital signal, an analog signal, and/or the like, as described herein. Additionally or alternatively, the control signal(s) may include an interruption in an electrical signal, as described herein.

At step 904, one or more processors may broadcast the control signal(s). For example, the front of the vehicle device may transmit the control signal(s) via a communication interface (e.g., first communication interface), as described herein. Additionally or alternatively, the inputs and/or a remote server (e.g., PTC server, ETMS server, and/or the like)) may broadcast the control signals directly to end of vehicle device, as described herein.

At step 906, one or more processors may receive the control signal(s). For example, the end of vehicle device may receive via a communication interface (e.g., second communication interface) the control signal(s) transmitted from a communication interface (e.g., first communication interface) of the front of the vehicle device, as described herein. Additionally or alternatively, the end of vehicle device may receive the control signal(s) from the inputs, and/or a remote server (e.g., PTC server, ETMS server, and/or the like)), as described herein.

At step 908, one or more processors may change a state of the indicator based on the control signal(s). For example, a state of the indicator may be changed by a controller (based on the control signal(s), as described herein.

In some example embodiments, the indicator may include a light source, as described herein. For example, the light source may include at least one of an illumination fixture, a light emitting assembly, a light bulb, a light emitting diode, a laser, an infrared light source, an ultraviolet light source, a visible light source, and/or the like, as described herein.

In some example embodiments, the indicator may include a high visibility marker of an end of vehicle device, as described herein. In some example embodiments, the indicator may include an indicator/light source separate from the high visibility marker, as described herein. In some example embodiments, an indicator may be removably connected to the end of vehicle device, as described herein.

In some example embodiments, at least one first control signal may be overridden in response to at least one second control signal, as described herein. In some example embodiments, the state of the indicator may be one of on, off, first/default brightness, second/enhanced brightness, one of a plurality of different states, and/or the like, as described herein. In some example embodiments, the front of the vehicle device may display an indication of the state of the indicator, as described herein. In some example embodiments, an image capture device may be disposed proximate to the indicator, and the state of the indicator may be changed to an on state and/or an enhanced brightness state to illuminate at least part of a viewing area of the image capture device, as described herein. Additionally or alternatively, the end of vehicle device may display an image and/or video captured by the image capture device, as described herein.

In some example embodiments, an end of vehicle device may turn on a high visibility marker when light conditions reach a certain threshold for a certain amount of time, and such functionality may be autonomous to the end of vehicle device. Allowing a HOT device to command/control the high visibility marker and/or other lights/indicators) may increase control over the end of vehicle device and add flexibility to the system for future applications. For example, a light/indicator may be either built into the end of vehicle device and/or coupled to/removably plugged into the end of vehicle device. Additionally or alternatively, such a light/indicator may have its own set of functions, including various patterns and/or apertures (e.g., brightness levels).

In some example embodiments, an indicator may be turned on/off and/or change state based on time of day and location, or based on when a light sensor fails. Additionally or alternatively, an indicator may be turned on/off and/or change state when required by local regulations even if light conditions exceed the threshold. Additionally or alternatively, an indicator may be turned on/off and/or change state based on emergency situations and/or to provide/increase illuminating light in any light condition. Additionally or alternatively, an indicator may be used as a light source for image/video capture. Additionally or alternatively, timing of a flash of an indicator may be synchronized/shifted to coordinate with image/video capture, e.g., to reduce artifacts created by the indicator flashing out of sync with the image/video capture device. Additionally or alternatively, a PTC protocol input for indication of conditions related to a rail vehicle may be relayed to the indicator. Additionally or alternatively, laser pointer control may be enabled.

Thus, provided is a vehicle system where a first vehicle has an end of vehicle device with a notification light that provides a second vehicle information associated with the first vehicle. The notification light may use varying colors, intensity, persistence, words, numbers, patterns, etc. each conveying information about the first vehicle. The operator of the second vehicle may see the notification light and make immediate decisions related to operating the second vehicle. Thus, safety is improved, and vehicles are able to operate at high speeds, with less room between vehicles accordingly.

In one or more embodiments, a system is provided that includes a notification light configured to be coupled with a first vehicle and to emit light to notify an approaching, second vehicle of the location of the first vehicle. The system also includes a controller including one or more processors configured to determine one or more of a direction of movement of the first vehicle, a speed of the movement of the first vehicle, or a distance between the first vehicle and the approaching, second vehicle. The controller is configured to notify the approaching, second vehicle of the one or more of the direction of the movement of the first vehicle, the speed of the movement of the first vehicle, or the distance between the first vehicle and the second vehicle by directing the notification light to change a characteristic of the light emitted by the notification light.

Optionally, the characteristic of light emitted by the notification light that is changed is the color of the light emitted by the notification light. Alternatively, the characteristic of the light emitted by the notification light that is changed is a persistence of the light, the persistence of the light including at least one of steady state light or flashing light. In another example, the notification light includes plural light sources and the characteristic of the light changed includes activating a first group of the plural light sources while not activating a second group of the plural light sources. The first group of plural light sources may form a determined pattern, and the determined pattern may form a word. In another example, the characteristic of light includes an intensity of the light.

Optionally, the system also includes at least one sensor electrically coupled to the one or more processors and configured to receive an input used to determine the direction of movement of the first vehicle, the speed of the movement of the first vehicle, or the distance between the first vehicle and the approaching, second vehicle. The at least one sensor may be one of a global position system receiver, a magnetometer, an infrared sensor, lidar, time-of-flight (TOF) sensor, vibration sensor, ultrasound sensor, or a sound sensor.

In one aspect, the one or more processors are further configured to receive a communication signal from a second control system associated with the second vehicle, and determine the at least one of the direction of the movement of the first vehicle, the speed of the movement of the first vehicle, or the distance between the first vehicle and the second vehicle by based on the communication signal. Optionally, the one or more processors are further configured to receive an electrical signal from an off-board source of electric current while the first vehicle moves along one or more routes, and determine the at least one of the direction of the movement of the first vehicle, the speed of the movement of the first vehicle, or the distance between the first vehicle and the second vehicle based on the electrical signal.

In one or more embodiment, a method is provided that includes determining one or more of a direction of movement of a first vehicle, a speed of the movement of the first vehicle, or a distance between the first vehicle and an approaching, second vehicle. The method also includes notifying the approaching, second vehicle of the one or more of the direction of the movement of the first vehicle, the speed of the movement of the first vehicle, or the distance between the first vehicle and the second vehicle by changing a characteristic of the light emitted by the notification light.

Optionally, changing the characteristic of light emitted by the warning light includes one of changing color of the light, changing persistence of the light, changing intensity of the light, or forming a determined pattern with the light. In another aspect, the method includes receiving at least one input from a global positioning sensor, magnetometer, off-board control system, or off-board electrical source, and changing the characteristic of light based on the at least one input received.

In an example, the method also includes notifying the approaching, second vehicle of the one or more of the direction of the movement of the first vehicle, the speed of the movement of the first vehicle, or the distance between the first vehicle and the second vehicle by changing a characteristic of sound emitted by a sound generating device coupled to the warning light.

In one or more embodiments a system is provided that includes a notification light configured to be coupled with a first vehicle and to emit light to notify an approaching, second vehicle of the location of the first vehicle, and at least one sensor electrically coupled to the one or more processors and configured to receive an input associated with a direction of movement of the first vehicle, a speed of the movement of the first vehicle, or a distance between the first vehicle and an approaching, second vehicle. The system also includes, one or more processors configured to determine one or more of the direction of movement of the first vehicle, the speed of the movement of the first vehicle, or the distance between the first vehicle and the approaching, second vehicle based on the input of the at least one sensor. The one or more processors may be configured to notify the approaching, second vehicle of the one or more of the direction of the movement of the first vehicle, the speed of the movement of the first vehicle, or the distance between the first vehicle and the second vehicle by directing the notification light to change a characteristic of the light emitted by the notification light.

Optionally, the at least one sensor is one or more of a global positioning system sensor, a magnetometer, an infrared sensor, or a sound system. In one aspect, the one or more processors are also configured to vary color of the light emitted by the notification light to change the characteristic of the light emitted by the notification light.

Optionally, the one or more processors are further configured to vary a sound output of the notification light based on the input of the at least one sensor. In another aspect, the one or more processors are further configured to receive a signal from an off-board source, and change the characteristic of the light emitted by the notification light based on the signal from the off-board source.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   a notification light, other than braking lights, configured to be coupled with a first vehicle and to emit light to notify an approaching, second vehicle of a location of the first vehicle; and
   a controller including one or more processors configured to determine one or more of a direction of movement of the first vehicle, a magnitude of speed of the movement of the first vehicle, or a distance between the first vehicle and the approaching, second vehicle,
   the controller configured to, in addition to emitting the light to notify the approaching, second vehicle of the location of the first vehicle, notify the approaching, second vehicle of at least the actual speed of the movement of the first vehicle, and the actual distance between the first vehicle and the second vehicle by directing the notification light to change a characteristic of the light emitted by the notification light.

2. The system of claim 1, wherein the characteristic of light emitted by the notification light that is changed is the color of the light emitted by the notification light.

3. The system of claim 1, wherein the characteristic of the light emitted by the notification light that is changed is a persistence of the light, the persistence of the light including at least one of steady state light or flashing light.

4. The system of claim 1, wherein the notification light includes plural light sources and the characteristic of the light changed includes activating a first group of the plural light sources while not activating a second group of the plural light sources.

5. The system of claim 4, wherein the first group of plural light sources form a determined pattern.

6. The system of claim 5, wherein the determined pattern forms a word.

7. The system of claim 1, wherein the characteristic of light includes an intensity of the light.

8. The system of claim 1, further comprising:
   at least one sensor electrically coupled to the one or more processors and configured to receive an input used to determine, the actual speed of the movement of the first vehicle, or the actual distance between the first vehicle and the approaching, second vehicle.

9. The system of claim 8, wherein the at least one sensor is one of a global position system receiver, a magnetometer, an infrared sensor, lidar, time-of-flight (TOF) sensor, vibration sensor, ultrasound sensor, or a sound sensor.

10. The system of claim 1, wherein the one or more processors are further configured to:
    receive a communication signal from a second control system associated with the second vehicle; and
    determine the at least one of, the actual speed of the movement of the first vehicle, or the actual distance between the first vehicle and the second vehicle by based on the communication signal.

11. The system of claim 1, wherein the one or more processors are further configured to:
    receive an electrical signal from an off-board source of electric current while the first vehicle moves along one or more routes;
    determine the at least one of, the actual speed of the movement of the first vehicle, or the actual distance between the first vehicle and the second vehicle based on the electrical signal.

12. A method comprising:
    determining one or more of magnitude of actual speed of the movement of the first vehicle, or an actual distance between the first vehicle and an approaching, second vehicle;
    determining information to provide the approaching second vehicle based on the magnitude of actual speed of the movement of the first vehicle, or the actual distance between the first vehicle and the approaching, second vehicle; and
    notifying the approaching, second vehicle of at least the magnitude of actual speed of the movement of the first vehicle and the actual distance between the first vehicle and the second vehicle based on the information determined by changing a characteristic of a light emitted by a notification light, other than braking lights.

13. The method of claim 12, wherein changing the characteristic of light emitted by the notification light includes one of changing color of the light, changing persistence of the light, changing intensity of the light, or forming a determined pattern with the light.

14. The method of claim 12, further comprising:
    receiving at least one input from a global positioning sensor, magnetometer, off-board control system, or off-board electrical source; and changing the characteristic of light based on the at least one input received.

15. The method of claim 12, further comprising:
notifying the approaching, second vehicle of the one or more of the direction of the actual speed of the movement of the first vehicle, or the actual distance between the first vehicle and the second vehicle by changing a characteristic of sound emitted by a sound generating device coupled to the notification light.

16. The method of claim 12, wherein the information includes at least one of a traveling speed of the first vehicle or a traveling direction of the first vehicle.

17. A system, comprising:
a notification light, other than braking lights, configured to be coupled with a first vehicle and to emit light to notify an approaching, second vehicle of the location of the first vehicle;
at least one sensor electrically coupled to one or more processors and configured to receive an input associated with a magnitude of speed of the movement of the first vehicle, or a distance between the first vehicle and an approaching, second vehicle; and
the one or more processors configured to determine one or more of the magnitude of speed of the movement of the first vehicle based on the input of the at least one sensor,
the one or more processors further configured to notify the approaching, second vehicle of the magnitude of speed of the movement of the first vehicle and the distance between the first vehicle and the approaching, second vehicle by directing the notification light to change a characteristic of the light emitted by the notification light.

18. The system of claim 17, wherein the at least one sensor is one or more of a global positioning system sensor, a magnetometer, an infrared sensor, or a sound system.

19. The system of claim 17, wherein the one or more processors are further configured to:
vary color of the light emitted by the notification light to change the characteristic of the light emitted by the notification light.

20. The system of claim 17, wherein the one or more processors are further configured to vary a sound output based on the input of the at least one sensor.

21. The system of claim 17, wherein the one or more processors are further configured to:
receive a signal from an off-board source while the first vehicle moves along one or more routes; and
change the characteristic of the light emitted by the notification light based on the signal from the off-board source.

* * * * *